L. C. LAZEAR.
STEERING WHEEL.
APPLICATION FILED AUG. 28, 1916. RENEWED FEB. 21, 1919.

1,311,130.

Patented July 22, 1919.
2 SHEETS—SHEET 2.

Witness:
Harry S. Gaither

Inventor:
Leroy C. Lazear
by Blanning & Blanning
Attys

UNITED STATES PATENT OFFICE.

LEROY C. LAZEAR, OF CHICAGO, ILLINOIS.

STEERING-WHEEL.

1,311,130.   Specification of Letters Patent.   Patented July 22, 1919.

Application filed August 28, 1916, Serial No. 117,167. Renewed February 21, 1919. Serial No. 278,515.

*To all whom it may concern:*

Be it known that I, LEROY C. LAZEAR, a citizen of the United States, residing at Chicago, in the county of Cook and State of Illinois, have invented certain new and useful Improvements in Steering-Wheels, of which the following is a specification.

The present invention has to do with steering wheels for automobiles, motor-boats and the like, and is specially concerned with means for interlocking the wheel with the steering apparatus, and with means by which this interlocking connection may be disestablished to render the steering wheel inoperative.

Various forms of steering wheel locks for automobiles and the like have heretofore been devised, usually involving the attachment of certain unsightly parts to the steering wheel or the post upon which it is mounted. Such steering wheel locks, furthermore, are ordinarily complicated and ineffective as well, so that they perform inadequately their intended functions. In addition to these disadvantages which I have mentioned, it is usually not difficult for an unauthorized person to pick or tamper with the locks so provided, in consequence of which no real protection is afforded. My improved steering wheel provides a connection with the steering apparatus which is substantially the same in appearance as others commonly in use; it includes means, however, by which the wheel may be readily rendered operative or inoperative, as desired. It is furthermore simple and positive in its action, and retains within its own body all the operative elements necessary to effect the desired locking and unlocking actions. For these as well as other reasons it is practically immune from tampering. The present steering wheel, moreover, may be attached to the ordinary steering post without requiring special parts or accessories, in consequence of which it may be supplied as an ordinary adjunct to standard forms of steering apparatus for automobiles, motor-boats and the like. These and other objects of my invention will more fully hereinafter appear from the specification and claims, and from the accompanying drawings, in which:—

Figure 1:
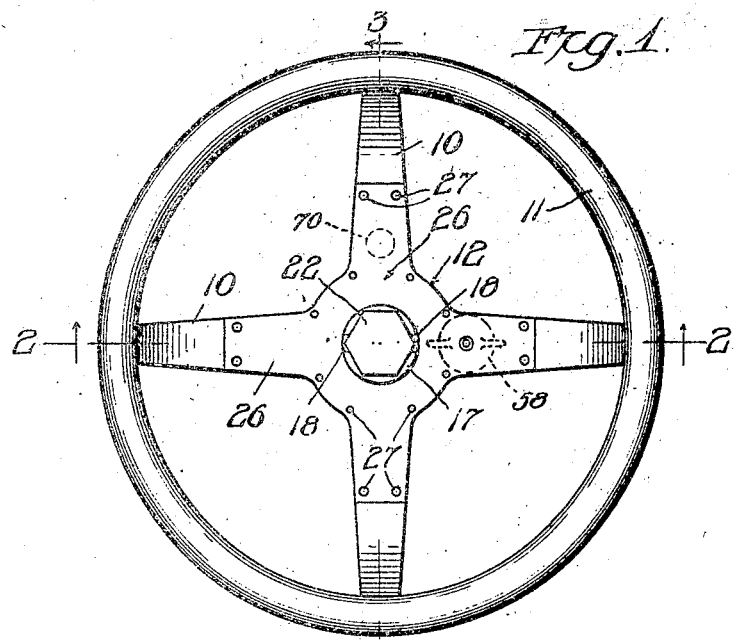
Figure 1 is a plan view of a steering wheel constructed in accordance with my invention.

The wheel of my invention comprises spokes or arms 10, preferably four in number, to the ends of which is secured a circular rim 11. These spokes or arms are united centrally to a hub 12 which surrounds a sleeve 13 having at its upper end an inturned flange 14. This sleeve may be fitted over the upper end of the ordinary post or housing 15 within which the steering shaft 16 is located, the flanged portion of the sleeve resting upon the upper end of the post.

The sleeve is interlocked to the steering shaft through means as follows: A ring-shaped plate 17 having outwardly projecting lugs 18 and inwardly projecting lugs 19 on opposite sides thereof is arranged to fit upon the sleeve end, suitable recesses 20 being provided therein in which the lugs 18 may lie. Slots 21 are also formed in the upper end of the steering shaft within which the lugs 19 may lie. By forming the ring-shaped plate with an inside diameter substantially equal to the outside diameter of the shaft, and with an outside diameter substantially equal to the inside diameter of the sleeve, the plate 17 may fit within the sleeve and over the shaft, thus preserving the shaft in spaced relation to the sleeve. A nut 22 is arranged to be threaded upon the upper end of the steering shaft, in which position it securely holds the plate 17 in interlocking position with the sleeve 13 and the steering shaft 16.

Arranged circumferentially upon the sleeve are a number of dove-tail shaped projecting elements 23, preferably four in number, to correspond with the number of spokes, these projections having between them spaces or slots 24 of equal width. It is intended that the side faces 25 of the projections shall stand at such an angle that the spaces therebetween shall be bounded by slightly diverging walls. These projecting elements lie within a chamber A formed in the hub of the wheel from which chamber other chambers branch out into the spoke portions of the wheel. It is preferred that these chambers shall be formed by hollowing out the upper side of the wheel, and that a spider-shaped plate 26 shall be secured thereover by rivets 27 or other appropriate means, to bar access to the mechanism within the chambered portion of the wheel. The presence of the projecting elements 23 within the chamber A serves to hold the wheel in a fixed longitudinal position upon the post or housing, but I prefer to support the weight of the wheel by the use of a lock nut 28 screwed upon the sleeve and bearing upon the under side of the wheel hub.

The present steering wheel is equipped with means for locking or unlocking the wheel relative to the sleeve 13, so as to render the steering apparatus operative or inoperative, according as may be desired. For the purpose of establishing a secure locking connection between the wheel and the sleeve, without detracting in any way from the trim appearance of the wheel, I have provided mechanism housed entirely within the chambered portions of the wheel, as follows:

One of the chambers, designated as B, is provided with opposite walls 29, substantially parallel to each other, and at its outer end with a pocket or recess 30. Another chamber C, located in the spoke diametrically opposite to the spoke in which the chamber B is situated, is likewise provided with side walls 31 and an outer end pocket or recess 32. Positioned within the chamber B is a clutch plate 33, having bow-shaped arms 34 extending across the chamber A and into the chamber C. A spring 35 situated within the pocket 30 normally exerts tension upon the end of the clutch plate such as to cause it to move inwardly. The inner or acting end 36 of the clutch plate is curved and provided with a tapered head to conform to the sleeve surfaces with which it engages. The sleeve projections 23 which extend into the hub chamber may receive between any two of them the acting end 36 of the clutch plate, and when the parts are so related the thrust exerted upon the clutch plate by the projections 23 will be in such directions as not to cause the clutch plate to be retracted from engaging position against the tension of the spring 35. The bowed arms 34 which extend across to the chamber C provide between them sufficient clearance for movement of the projecting elements 23. A portion of the outer sides of each of these bowed arms may be flattened as at 37 to fit slidingly against walls 38 provided within the chamber A. The arms 34 near the chamber C are converged to a point where the space between them substantially equals the space between two of the dove-tail projections 23 on the sleeve 13, from which point end portions 39 of each arm extend straight into the chamber C.

Figure 4:
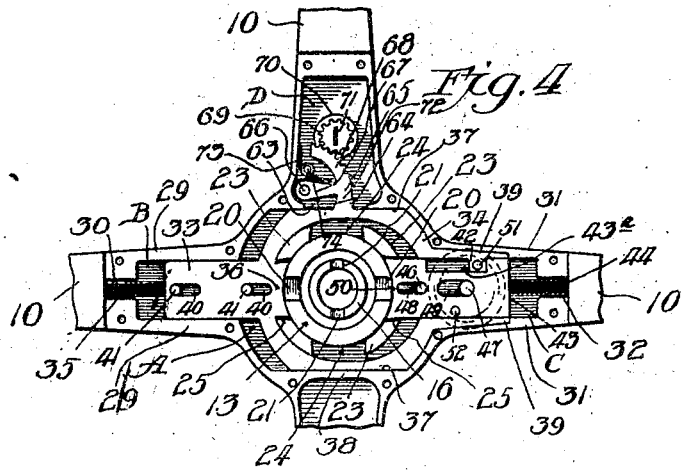
Fig. 4 is an enlarged fragmentary view through the central portion of the wheel, with the spider plate removed to exhibit the parts within the wheel chamber, the clutch members in this view being locked with the steering mechanism.

The clutch plate 33, as has been previously noted, is arranged to be moved lengthwise across the chambers A, B and C, and for this purpose sufficient clearance within these chambers is provided. The direction and limit of movements of the clutch plate is determined by slots 40 formed therein through which extend pins 41 secured to the wheel spoke. Upon one of the arm ends 39 lying within the chamber C, a shoulder 42 is formed which projects inwardly a slight distance. Between the arm ends 39 within the chamber C I have also arranged a second clutch plate 43 on one side of which is an open elongated slot 43$^a$ to provide clearance for the shoulder 42. A spring 44, preferably located within the pocket 32 in the outer end of the chamber C, is arranged to engage with the second clutch plate 43 to normally hold the same in engagement with the sleeve 13, as shown in Fig. 4. The movement of this plate is guided between the arm ends 39 and by two pins 46 and 47 projecting into slots 48 and 49, respectively, formed in its body. The acting end 50 of this second clutch plate functions with respect to the projections 23 on the sleeve similarly to the end 36 of the other clutch plate 33.

Figure 2:
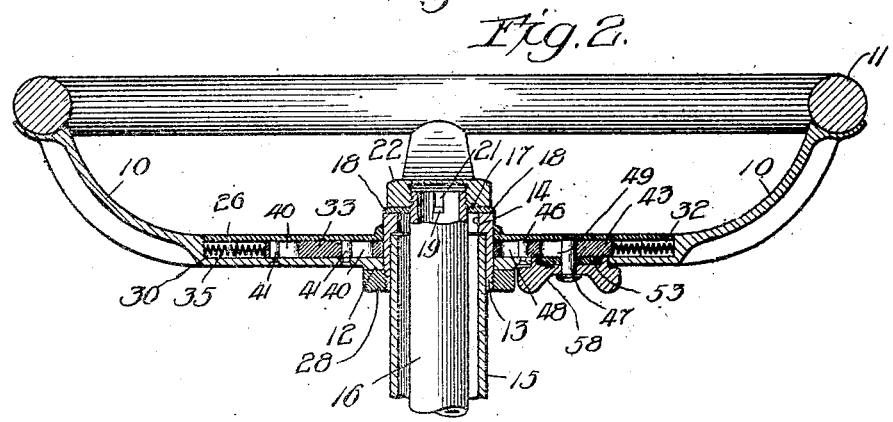
Fig. 2 is an enlarged sectional view through the steering wheel, taken on line 2—2 of Fig. 1.
Figures 6, 7, 8:
Fig. 6 is a cross-section through one of the wheel spokes, taken on line 6—6 of Fig. 5, showing the lever by which the locking action is controlled.
Fig. 7 is a view looking upon the under side of the controlling lever.
Fig. 8 is a view of the slotted plate engaged by the locking lever.
Figure 9:
Fig. 9 is a view of the plate forming the interlocking connection between the wheel and shaft.

Secured to the shoulder 42 and the second clutch plate 43 are two pins 51 and 52, respectively, occupying diametrically opposite positions with respect to the pin 47. A circular plate 53 having slots 54 and 55 and a central opening 56 is pivotally secured to the pin 47, in which position the pins 51 and 52 are extended through the slots 54 and 55, respectively. Upon opposite sides of the plate 53 peripheral notches 57 are provided, as best shown in Fig. 8. The position of the plate 53 with respect to the wheel spokes is indicated clearest in Fig. 2. Upon the under side of the wheel I have pivotally mounted a cap-shaped lever 58 in position to overlie the circular plate 53. This lever 58 is formed with a central opening 59, through which the pin 47 is extended to secure the lever in position, there being a peripheral flange 60 arranged to overlie the plate 53. Projecting inwardly from the flange 60 are arcuate-shaped projections 61 of the same size and shape as the notches 57 in the plate 53. It is intended that these projections shall lie within the said notches so as to lock the lever cap and plate securely against relative rotation. The lever may be equipped with wings 62 to afford a better hold for the fingers when it is desired to operate the locking mechanism.

Figure 5:
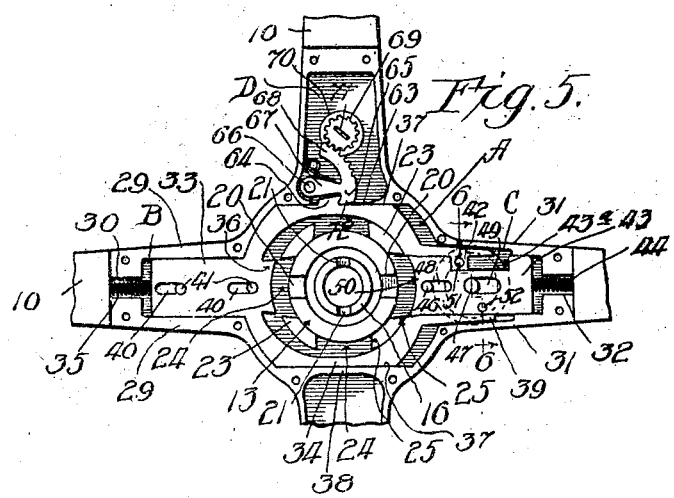
Fig. 5 is a view similar to Fig. 4, showing the clutch members disengaged from the steering mechanism.

From the foregoing description it will be apparent that the chambers A, B and C contain locking mechanism arranged to engage or disengage with the steering apparatus. Each of the clutch plates 33 and 43 normally occupies a locking position between two of the projections 23 on the sleeve 13 (see Fig. 4) which, as previously explained, is locked to the steering shaft. In this position the wheel is operative for use, and the steering apparatus may be manipulated for all purposes. When, however, it is wished to disengage the locking elements from the sleeve, the lever 58 may be manipulated for this purpose. A slight turn of this lever will cause the circular plate 53 to be revolved, whereupon the pins 51 and 52, together with the clutch plates to which they are secured, will be moved in opposite directions from the position shown in Fig. 4 to that of Fig. 5. The clutch members 33 and 43 will accordingly be moved outwardly from engaging position with the projecting elements upon the sleeve, so that the wheel may then be revolved freely without in any way affecting the steering apparatus.

Figure 3:
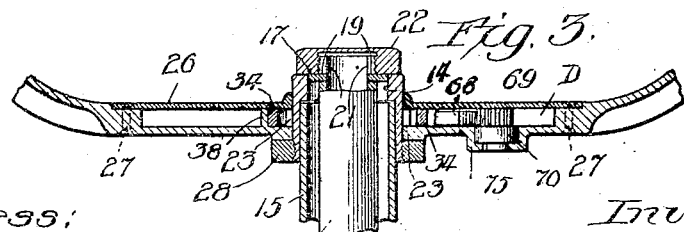
Fig. 3 is an enlarged sectional view through the steering wheel, taken on line 3—3 of Fig. 1.

It will not suffice, however, if the clutch members remain disengaged only temporarily in the manner explained, but other means should be provided for holding the clutch elements retracted in unlocking position, in order that the wheel may be rendered inoperative for any length of time. For this purpose I have provided means as follows:

In one of the arms intermediate those in which the chambers B and C are formed is another chamber D. The wall 38 separating this chamber from the chamber A is broken, as at 63, to permit of the extension therethrough of a lug 64 formed on the proximate arm 34 of the clutch plate. The broken portion 63 of the wall 38 is sufficiently long to allow free movement of the lug 64 when the clutch plate is advanced or retracted. Within the chamber D a latch member 65 is pivoted as at 66, this member consisting of an arm 67, from the end of which extends a rack sector 68. Meshing with this rack sector is a pinion 69, connected to a lock 70, which is controlled and operated by a key entered into a slot 71. The end of this rack sector is extended in the direction of the lug 64 to provide a head 72, which normally rests upon the lug. A spring 73 coiled around a pin 74 within the chamber D engages with the latch member 65 in such a way as normally to hold its head portion 72 in engagement with the lug 64. When the clutch plate 33 is retracted to the position shown in Fig. 4, the latch plate will be free to move under tension of the spring 73, so that its head will drop down and engage with the side of the lug 64 to hold the clutch plate from a return movement inwardly. Because of the connection maintained between the clutch plates through the circular plate 53, it follows that the clutch member 43 will likewise be held in retracted position through the agency of the latch member 65. In Fig. 3 the arrangement of the lock 70 within the chamber D is clearly shown, a hollow boss 75 being provided upon the under side of the wheel arm for the purpose of partially housing the lock.

The chambered wheel construction which I have described is the one which I prefer for the present invention. In the manufacture of the wheel access is provided for through the upper side of the arms. When the locking mechanism has been completely installed, the spider-shaped plate 26 may then be fitted neatly over the arms and hub, and be riveted in place. It will then be impossible to remove the plate, so that the interior mechanism will be immune for tampering. Likewise, the pin 47 which serves both to guide the movements of the second clutch plate 43 and as a pivotal mounting for the plate 53 and lever 58, may be riveted through the spoke so as not to be removable.

It will be apparent that the latch member will hold the clutch members retracted to render the steering wheel inoperative, and will continue to hold the parts in such position for an indefinite period. It is only by the insertion of a proper key in the lock that the latch member may be withdrawn from engaging position with the lug 64. Under such circumstances each of the clutch plates will be moved instantly under tension of the springs 35 and 44 to be engaged with the sleeve 13. In order that the acting ends of the clutch members may properly lodge between the projections 23 formed upon the sleeve, it is necessary merely to revolve the steering wheel a slight distance in one direction or the other until two opposite spaces 24 between these projections shall have alined with the acting ends of the clutch plates.

By employing the sleeve 13 and interlocking connection with the shaft 16, the present wheel is applicable for use with steering apparatus as now commonly made. Also, it is an advantage for reasons of economy in manufacture to construct the parts substantially in the manner which I have described. Likewise, I have made use of the circular plate 53 between the lever 58 and the pins 51 and 52. This construction is advantageous in that the circular plate may be formed by a stamping process and when covered by a cap-shaped lever, entirely conceals the pins 51 and 52 and prevents their being tampered with.

It will be observed that the present mechanism is exceedingly simple and compact. When housed within the spokes of the wheel in the manner described it will be entirely concealed. The parts are securely protected from tampering, and cannot be manipulated to render the wheel operative, unless the proper key be used. With the aid of such a key, however, a slight turn of the wheel is all that is required to render the steering apparatus serviceable for use.

It is possible to embody my invention in other forms than the one herein shown and described without in any way departing from the principle of operation disclosed. I accordingly do not desire to be limited in my invention to the exact form which I have illustrated, but intend to include such other modifications as may properly fall within the scope of the present invention.

I claim:

1. Steering apparatus embodying, in combination, a shaft, a sleeve upon the shaft, there being slots formed in the sleeve and shaft, a connecting plate between the sleeve and shaft having projections arranged to lie within the said slots, whereby the sleeve and shaft are interlocked against relative rotation, a chambered wheel idly mounted upon the sleeve, and means located within the chambered portion of the wheel for interlocking the wheel and sleeve against relative rotative movement, substantially as described.

2. Steering apparatus embodying, in combination, a shaft, a sleeve upon the shaft, there being slots within the sleeve and shaft, a connecting plate between the sleeve and shaft having projections arranged to lie within the said slots, whereby the sleeve and shaft are interlocked against relative rotation, a cap threaded upon the shaft arranged to overlie the connecting plate to hold the same in place, and when removed to permit removal of the plate and sleeve from off the shaft, a chambered wheel idly mounted upon the sleeve, and means within the chambered portion of the wheel for interlocking the wheel and sleeve against relative rotation, substantially as described.

3. Steering apparatus embodying, in combination, a shaft, a sleeve upon the shaft, a removable interlocking connection between the sleeve and shaft, projecting elements spaced equidistantly upon the sleeve and providing between them slots whose opposite walls slightly diverge, a chambered wheel idly mounted upon the sleeve, the projecting sleeve elements being disposed within the chambered portion of the wheel, and clutch members within the chambered portion of the wheel movable into position between the projecting sleeve elements for interlocking the wheel and sleeve, substantially as described.

4. Steering apparatus embodying, in combination, a shaft, a sleeve upon the shaft, there being slots formed in the sleeve and shaft, a connecting plate between the sleeve and shaft having projections arranged to lie within the said slots, whereby the sleeve and shaft are interlocked against relative rotation, a wheel mounted upon the sleeve, and clutch members carried by the wheel arranged to engage with the sleeve to interlock the wheel therewith, substantially as described.

5. Steering apparatus embodying, in combination, a shaft, a sleeve upon the shaft, there being slots formed in the sleeve and shaft, a connecting plate between the sleeve and shaft having projections arranged to lie within the said slots, whereby the sleeve and shaft are interlocked against relative rotation, a cap threaded upon the shaft arranged to overlie the connecting plate to hold the same in place, and when removed to permit removal of the plate and sleeve from off the shaft, a wheel mounted upon the sleeve, and clutch members carried by the wheel arranged to engage with the sleeve to interlock the wheel therewith, substantially as described.

6. Steering apparatus embodying, in combination, a shaft, a sleeve upon the shaft, a removable interlocking connection between the wheel and shaft, a cap secured upon the shaft arranged to conceal the interlocking connection, projecting elements spaced equidistantly upon the sleeve and providing between them slots whose opposite walls slightly diverge, a wheel mounted upon the sleeve, and clutch members carried by the wheel movable into position between the projecting sleeve elements for interlocking the wheel and sleeve, substantially as described.

7. Steering apparatus embodying, in combination, a shaft, a sleeve upon the shaft, an interlocking connection between the sleeve and shaft, a spoked wheel idly mounted upon the sleeve, the spokes and hub portions of the wheel being chambered, clutch members within the chambered portion of the wheel arranged to engage with the sleeve to interlock therewith, whereby the wheel and sleeve are held against relative rotative movement, a lever pivotally secured to the exterior of the wheel, and means connecting the lever with the clutch members within the wheel for retracting the same from locking position, substantially as described.

8. Steering apparatus embodying, in combination, a shaft, a sleeve upon the shaft, an interlocking connection between the sleeve and shaft, a chambered wheel mounted upon the sleeve, a plurality of clutch members within the chambered portion of the wheel arranged to engage with the sleeve to interlock the wheel therewith, a finger piece arranged exteriorly of the wheel, and means connecting the finger piece with the clutch members within the wheel for retracting the same from locking position, substantially as described.

9. Steering apparatus embodying, in combination, a shaft, a spoked wheel operatively mounted upon the shaft, there being interconnecting chambers in the spoke and hub portions of the wheel, projecting elements secured to the shaft extending into the chambered portion of the wheel, a pair of movable clutch members within the wheel upon opposite sides of its axis, one of said members having an arm extended across the wheel hub to overlap the other clutch member, a pin carried upon the clutch member arm, a pin upon the clutch member proximate thereto, a lever mechanism pivoted intermediate said pins having slots within which the pins may lie and arranged when turned to engage the pins, whereby the clutch members are moved simultaneously in opposite directions, the clutch members when moved inwardly being arranged to engage with the projecting shaft elements to interlock the wheel with the shaft, substantially as described.

10. Steering apparatus embodying, in combination, a shaft, a chambered wheel operatively mounted upon the shaft, means within the chambered portion of the wheel for establishing and disestablishing an interlocking connection between the wheel and shaft, including movable clutch members, tension means for normally causing the members to move toward the shaft, projecting elements secured to the shaft with which the clutch members may engage when moved into locking position, means for causing the clutch members to be retracted into unlocking position, and means for holding the clutch members in retracted unlocking position comprising a lug on one clutch member, and a tension actuated latch arranged to engage with the lug when the clutch member is retracted, and means for releasing the latch from engaging position comprising a rack sector, and a key controlled pinion meshing with the rack sector, substantially as described.

11. Steering apparatus embodying, in combination, a shaft, a chambered wheel operatively mounted upon the shaft, and means within the chambered portion of the wheel for establishing and disestablishing an interlocking connection between the wheel and shaft, including movable clutch members within the wheel, elements secured to the shaft with which the clutch members may engage when moved into locking position, tension means for normally causing the clutch elements to move into locking position, means for retracting the clutch elements from locking position, and means for holding the clutch elements in retracted unlocking position consisting of a tension controlled latch arranged to engage with the clutch members when retracted to prevent return movement thereof, a rack sector upon the latch, and a key controlled pinion meshing with the rack sector for releasing the latch from engaging position, substantially as described.

12. Steering apparatus embodying, in combination, a shaft, a chambered wheel operatively mounted upon the shaft, means within the chambered portion of the wheel for establishing and disestablishing an interlocking connection between the wheel and shaft, including movable clutch members within the wheel, elements secured to the shaft with which the clutch members may engage when moved into locking position, and means for retracting the clutch members from locking position, comprising a pin on each of the clutch members, a pivotally mounted plate member in engagement with each of the pins, and a lever locked to the plate for rotating the same, whereby the clutch pins are moved in unison to retract the clutch members from locking position, substantially as described.

13. Steering apparatus embodying, in combination, a shaft, a wheel mounted upon the shaft, clutch members on diametrically opposite sides of the wheel arranged to engage with the shaft to interlock the wheel therewith, one of the said clutch members being extended across the wheel to overlie the other clutch member, and means in proximity to the overlying portions of the clutch members for moving the same simultaneously in opposite directions, substantially as described.

14. Steering apparatus embodying, in combination, a shaft, a wheel operatively mounted upon the shaft, means for interlocking the wheel and shaft, means for disestablishing the interlocking connection between the wheel and shaft, and other means for normally preventing reëstablishment of the interlocking connection between the wheel and shaft, substantially as described.

15. Steering apparatus embodying, in combination, a shaft, a wheel operatively mounted upon the shaft, elements movable from one position to another for locking or unlocking the wheel relative to the shaft, and separate means for holding the elements in either locking or unlocking position, substantially as described.

16. Steering apparatus embodying, in combination, a shaft, a wheel operatively mounted upon the shaft, clutch elements carried by the shaft, other clutch elements carried by the wheel and movable toward and from the clutch elements on the shaft and adapted to coöperate therewith, whereby the wheel may be locked or unlocked relative to the shaft, and separate means for holding the wheel clutch elements in either engaged or disengaged relation with the shaft clutch elements, substantially as described.

17. Steering apparatus embodying, in combination, a shaft, a wheel idly mounted upon the shaft, clutch members on diametrically opposite sides of the wheel arranged to engage with the shaft to interlock the wheel therewith, one of the said clutch members being provided with arms encircling the shaft and overlying the other of said clutch members and means for moving the clutch members into or out of engaging position with the shaft, substantially as described.

18. Steering apparatus embodying, in combination, a tube, a shaft within the tube, there being a space between the shaft and tube, a sleeve having an inturned flange at one end thereof arranged to fit over the end of the tube with its flanged portion upon the tube end, a ring-shaped plate member having inwardly and outwardly extending lugs interposed between the shaft and sleeve, there being slots within the shaft and sleeve ends within which the said lugs may lie to lock the sleeve shaft against relative rotative movement, and a wheel having means for connection with the sleeve, substantially as described.

LEROY C. LAZEAR.